Sept. 13, 1955     S. W. E. ANDERSSON     2,717,505
ICE RECEPTACLE AND DRIP TRAY
Filed Dec. 10, 1952
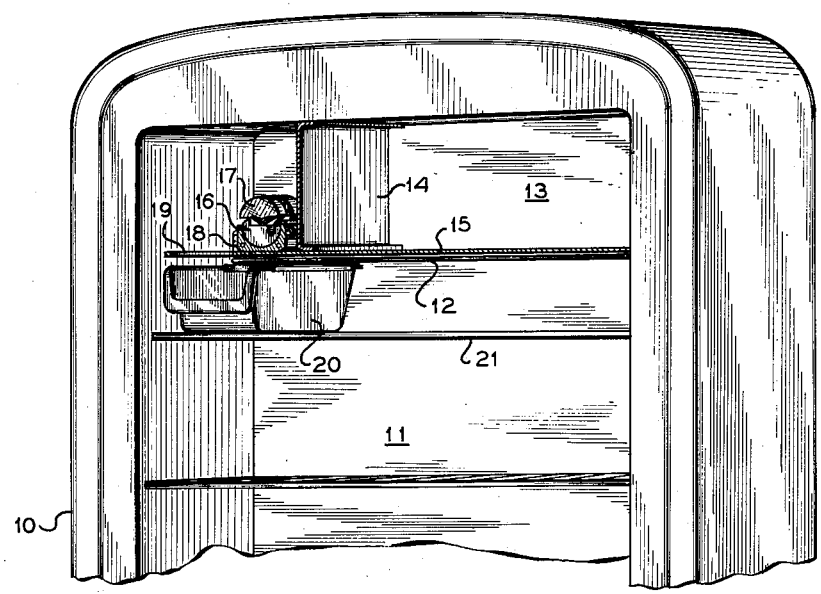
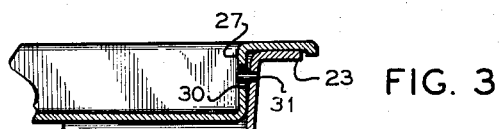
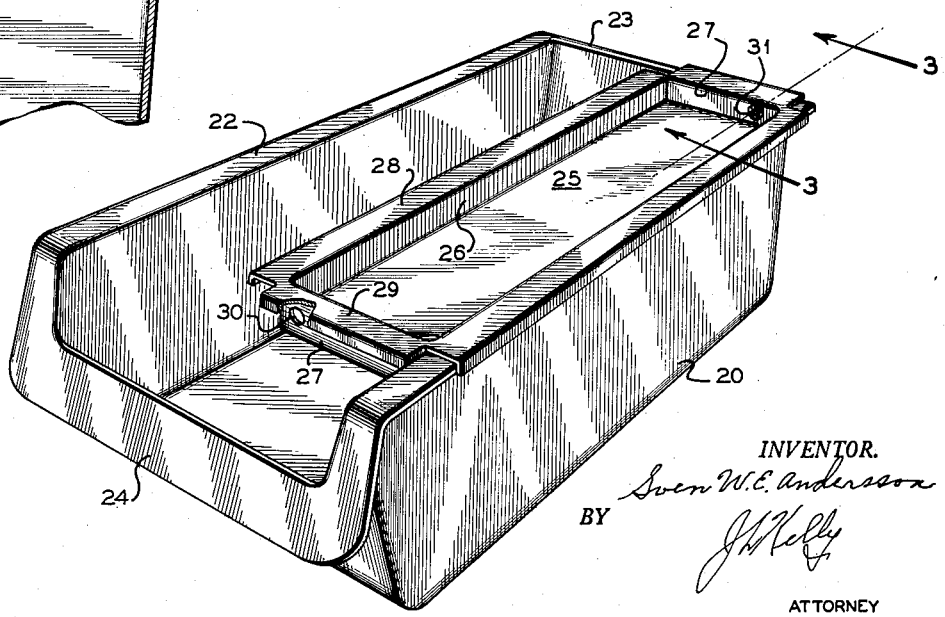
INVENTOR.
Sven W. E. Andersson
BY
ATTORNEY

2,717,505
Patented Sept. 13, 1955

2,717,505

ICE RECEPTACLE AND DRIP TRAY

Sven W. E. Andersson, Buffalo, N. Y., assignor to Servel, Inc., New York, N. Y., a corporation of Delaware Application December 10, 1952, Serial No. 325,148

1 Claim. (Cl. 62—105)

This invention relates to the care and preservation of foods and other substances including ice cubes which ordinarily are kept in a household refrigerator.

The invention is concerned with a household refrigerator of the modern type in which there is a storage compartment for foods ordinarily maintained at a temperature above freezing, a compartment where foods and other substances are ordinarily kept at a temperature below freezing, and ice molds in which small cubes or cakes of ice are congealed and subsequently stored in dry condition for use in various ways.

The invention relates to a combination ice receptacle and drip tray particularly adapted for use with an automatic ice-maker of the type disclosed and claimed in my copending application, Serial No. 205,519, filed January 11, 1951. In that application there is disclosed a household refrigerator equipped with an automatic ice maker wherein an ice forming mold has a generally arcuate contour so that pieces of ice may be readily turned or swept from the mold by relative turning movement between the mold and the ice pieces. The ice pieces are loosened in the mold by heat applied thereto by electric heating elements. The ice removing action is automatic, as is the filling of the mold, freezing, and loosening of the ice pieces. The ice pieces are detained for thorough drying before discharge to storage. The automatic operation is stopped short of discharge of ice to storage, and remains suspended during the time that a desired quantity of ice is held in the storage receptacle.

The electrical heating and thawing may cause drops of water to form and to fall into the storage receptacle and upon the ice pieces so that they may freeze together in a solid mass, preventing the removal of the pieces independently except with difficulty.

It is an object of the invention to provide an ice-maker drip pan for use in the collection and storage receptacle of the ice-maker of a household refrigerator in order to catch the drip so that the cubes or pieces of ice are kept dry and not permitted to freeze together into an unwieldy mass.

Further objects and advantages of the invention will be apparent from the following description taken in conjunction with the accompanying drawings, wherein:

Fig. 1 is a perspective of a refrigerator and ice-maker partly in section, illustrating one application of the invention;

Fig. 2, a perspective of a storage receptacle with the drip pan illustrative of the present invention applied thereto; and Fig. 3, a fragmentary detail on the line 3—3 of Fig. 2.

Briefly stated, the invention comprises a relatively small drip tray or pan which is mounted along the upper portion of the interior of a storage receptacle in a manner that when the receptacle is in use the drip pan will be disposed longitudinally beneath the ice-maker and when heat is applied to the ice mold to loosen the ice after it is congealed, drops of moisture from the exterior of the mold and from the freezing plate will be collected in the drip pan and will not be permitted to drop into the storage receptacle and wet the ice therein.

Referring to the drawing, a household refrigerator 10 has a storage compartment 11 maintained at a temperature above freezing by refrigerator coils 12. Likewise a compartment 13 is maintained at a temperature below freezing by greater and more intimate metal to metal contact with the coils 12.

Beyond the partition 14 which defines the end of the compartment 13 extends the bottom plate 15 of the compartment 13 and mounted thereon is an ice-maker 16 of the type in which semi-cylindrical pieces or cakes of ice 17 are frozen. The extension of the bottom 15 forms a freezing plate for the ice mold.

In the bottom of the ice mold are mounted electrical resistance heating elements 18 which supply heat to loosen the ice. The ice is then elevated to the position shown in Fig. 1 by conveyor mechanism, not shown, and is subsequently discharged downwardly through an opening 19 in the bottom 15.

Beneath the opening in the bottom 15 is a storage receptacle 20 which rests upon a shelf 21 of the refrigerator. The receptacle 20 has side flanges 22 and a rear flange 23, the flanges 22 terminating in a depending handle 24 at the front of the receptacle.

The drip tray or pan of the present invention, as best shown in Fig. 2, is an elongated structure corresponding in general configuration to that of the receptacle on which it is mounted. Such drip pan is reversible and is comprised of a bottom 25 with side walls 26 and end walls 27, the side and end walls being provided with marginal reinforcing flanges 28 and 29 and with the latter having openings 30 at each end. Since the drip pan is reversible when it is applied, one of its side flanges will rest upon one each of adjacent top and end flanges of the storage receptacle as disclosed.

To assist in maintaining the receptacles in the proper relation, an opening 30 is provided in each end of the drip pan and in the rear wall of the receptacle 20 is located a pin 31. In assembling, the relatively small tray or pan is placed within the upper portion of the storage receptacle so that the pin 31 of the latter is loosely received within the opening 30 of the former regardless of which end of the tray or pan is inserted first. With this construction the drip pan may be easily applied or removed and when it has collected water which due to the low temperature will be frozen, the contents of the pan may be emptied preventing wetting of the dry cold ice collected in the receptacle. Thus the collection receptacle and the drip pan will be maintained in conveniently assembled relation at all times.

It will be obvious to those skilled in the art that various changes may be made in the invention without departing from the spirit and the scope thereof and therefore the invention is not limited by that which is shown in the drawings and described in the specification but only as indicated in the appended claim.

What is claimed is:

In a household refrigerator having an ice-maker and electrical defrosting means for releasing pieces of ice therefrom and thereby producing drops of water, a storage receptacle for the ice, a drip pan for detachable engagement with the storage receptacle, said storage receptacle being substantially rectangular in horizontal section having at least one side and rear wall thereof terminating at the top in horizontal surfaces in a common horizontal plane and having a substantially horizontal pin in a rear upper corner thereof, said drip pan having an opening in each end wall at diagonally opposite corners thereof for the receipt of said pin, and said drip pan comprising a comparatively narrow receptacle which is shallow and elongated construction of a configuration substantially corresponding to that of the storage receptacle in which it is mounted and having horizontal flanges at its sides and ends so it may be applied longitudinally in the receptacle with a flange at one side and end of the pan resting on the horizontal surfaces of said one side and end wall of the receptacle and with one of said openings received by said pin for supporting the pan on the receptacle without regard relative to the location of the ends of the pan.

References Cited in the file of this patent

UNITED STATES PATENTS

| | | |
|---|---|---|
| 208,094 | Higgins | Sept. 17, 1878 |
| 2,149,255 | Fader | Mar. 7, 1939 |
| 2,218,724 | Rudd | Oct. 22, 1940 |
| 2,534,286 | Maitzen | Dec. 19, 1950 |